United States Patent [19]
Loughead

[11] 3,753,339
[45] Aug. 21, 1973

[54] SHRUBBERY LIFTER FOR LAWN MOWERS

[76] Inventor: Robert G. Loughead, 547 Concord Rd., Warminster, Pa. 18974

[22] Filed: Mar. 27, 1972

[21] Appl. No.: 238,441

[52] U.S. Cl. .................................. 56/119, 56/319
[51] Int. Cl. .......................................... A01d 63/00
[58] Field of Search ................... 56/319, 119, 251, 56/255, 256, 314

[56] References Cited
UNITED STATES PATENTS
3,197,950   8/1965   Griffith .............................. 56/255
2,970,420   2/1961   Schmidt ............................. 56/119
3,197,951   8/1965   Zick .................................. 56/319

Primary Examiner—Antonio F. Guida
Attorney—Zachary T. Wobensmith, 2nd

[57] ABSTRACT

A shrubbery lifter for mowers is provided which is particularly suited for power mowers and avoids likelihood of injury of the user by the mower blades. The lifter includes a readily attachable and detachable lifter arm pivotally carried at one side of the mower and movable to a position for lifting the lower branches to avoid injury thereto while cutting the grass or to an out of action position.

6 Claims, 3 Drawing Figures

PATENTED AUG 21 1973 3,753,339

SHRUBBERY LIFTER FOR LAWN MOWERS

BACKGROUND OF THE INVENTION

1. Field of the Invention

This invention relates to a shrubbery lifter for mowers and particularly power mowers.

2. Description of the Prior Art

It has heretofore been proposed to provide guards for reel type hand mowers, examples being shown in the patents to Quimby, U.S. Pat. No. 1,459,034 and Underwood, U.S. Pat. No. 2,308,218. These structures are cumbersome, do not properly handle the shrubbery and are not suited for power mowers.

Agee, in U.S. Pat. No. 1,626,712, discloses a vine lifter which comprises guards in the form of sheet metal shields mounted over each of the wheels of a reel type hand mower. The structure illustrated would afford only limited protection to surface trailing plants and vines because of the central accessibility to the reel and cutter blade, and is not suited for use with power mowers with enclosed blades.

Nelson, in U.S. Pat. No. 2,312,435, discloses a shrubbery fender for use with reel type hand mowers which includes a stationary longitudinally arched fender in the form of a bar circumferentially spaced from one of the wheels of the mower and a movable fender in the form of a concave bar with or without a generally triangular apron having a curved rear edge concentric with the mower wheel and with the apron disposed in a vertical plane or bent outwardly at its inner corner for deflecting debris. This structure, because of the exposed reel can be destructive of the shrubbery and is not suited for use with power mowers.

SUMMARY OF THE INVENTION

In accordance with the invention a shrubbery lifter is provided which is particularly suited for power mowers, which can be temporarily or permanently attached to the mower as desired, which has relatively few parts, which will effectively lift and prevent injury to the lower limbs of bushes and shrubs and with enhanced safety to the user, and in which an arm of strong but light weight construction and selectively mounted for predetermined height is pivotally carried for disposition for use or in an inactive position.

It is the principal object of the invention to provide structure carried by a power mower for protecting the lower branches of shrubbery and bushes during cutting of grass under and around the shrubbery and bushes.

It is a further object of the invention to provide adjustable shrubbery protecting structure for easy and quick assembly to a grass mower, temporarily or permanently as desired, and which has a position for use and a position for storage.

It is a further object of the invention to provide a shrubbery protective device for use with power mowers which renders the use of the mower safer because of its fending action on lower branches of shrubbery and bushes so that the user has complete control of the mowing action from the handle of the mower and without the necessity for reaching down to the mower to lift any parts of the shrubbery or bushes under which the grass is being cut.

It is a further object of the invention to provide a shrubbery lifter for lawn mowers with which more uniform cutting of the lawn including the grass around and under shrubbery and bushes can be effected and in a shorter time.

Other objects and advantageous features of the invention will be apparent from the description and claims.

Figure 1:
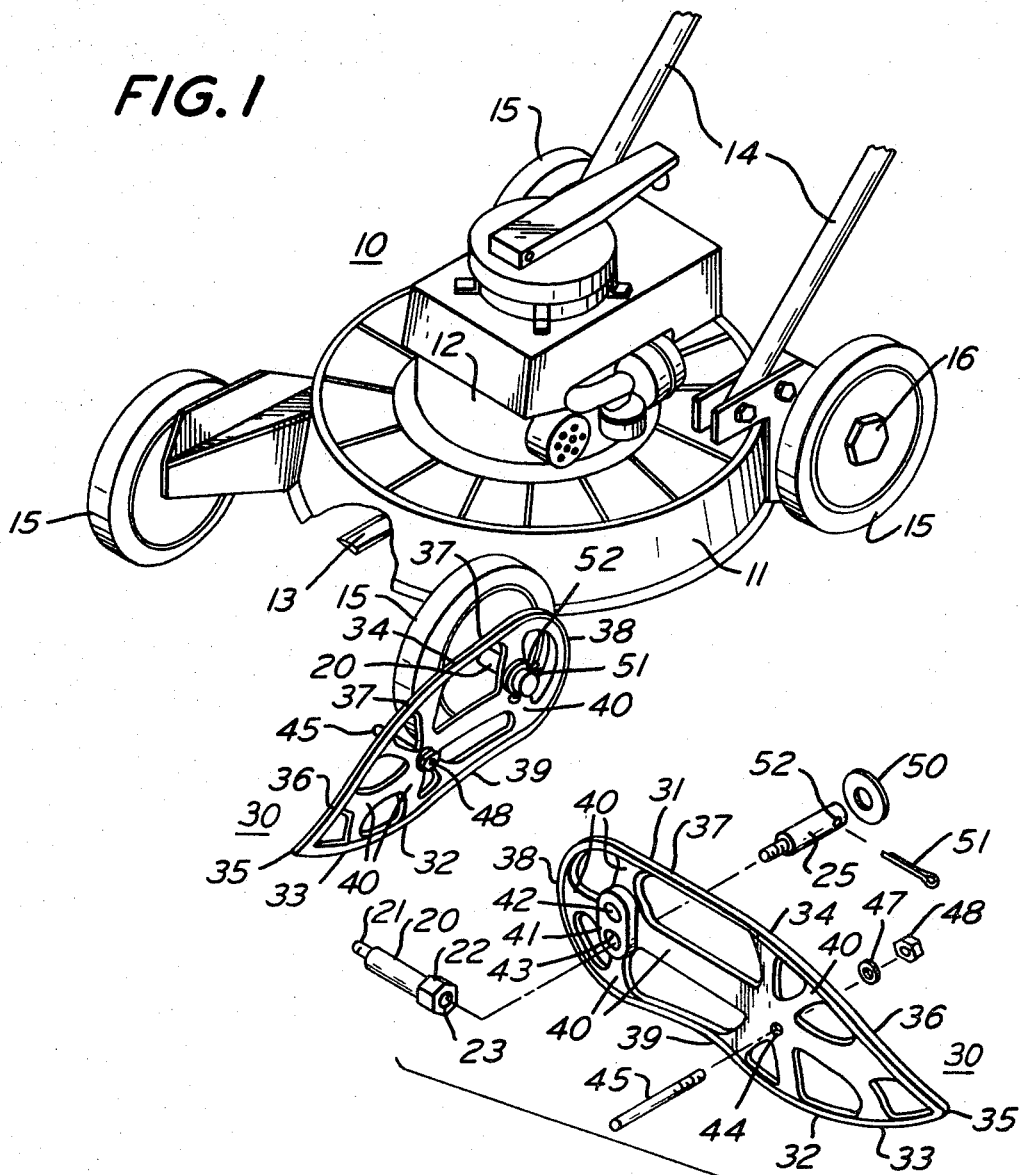
FIG. 1 is a view in perspective of a mower with the lifter arm in the position for use.
Figures 2, 3:
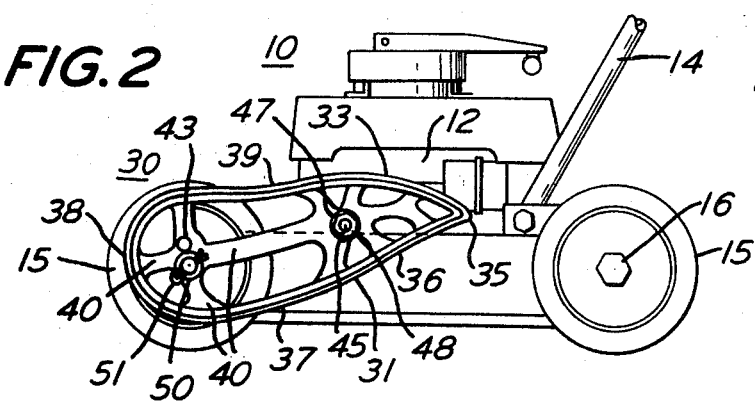
FIG. 2 is a side elevational view of the mower with the lifter arm in the out of use position.
FIG. 3 is an exploded perspective view of the lifter arm and its mounting structure.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, a power mower of well known type is shown generally at 10 and is provided with a housing 11 on which a rotary motor 12, preferably a gasoline operated engine, is secured to drive one or more horizontally disposed cutter blades 13.

The housing 11 has a handle 14 pivotally secured thereto in a well known manner for movement of the mower by the user.

The housing 11 is supported on a plurality of wheels 15. The wheels 15 are secured to the housing 11 by bolts 16, the bolt 16 for one of the forward wheels 15 being removed for mounting the shrubbery lifter of the invention.

A wheel axle 20 is provided having a threaded end 21 for reception in the threaded opening for the wheel bolt 16 which has been removed, and a hexagonal head 22 for aid in assembly to the housing 11.

The wheel axle 20 has an internally threaded opening 23 for the reception of the threaded end of an arm axle 25.

The lifter arm 30 is preferably elongated and of a length a plurality of times its height. The arm 30 has an enclosing rim 31 with a ground engaging portion 32 having a lower edge 33 rounded in transverse cross section. The remainder of the rim 31 is preferably transversely flat as at 34 on the exterior to present a wider surface to engage the shrubbery and the like to be lifted.

The lifter arm 30 is blunt pointed at its forward end 35, and has a slightly concaved portion 36 extending about a third of the length toward the rear from which a slightly convexed position 37 extends toward the rear. The rear end 38 is rounded in contour.

Extending rearwardly from the blunt point 35 the lower rim 32 is convexed for about half its length to facilitate its advancing movement along the ground, and is concaved as at 39 to connect to the rounded rear end 38.

The interior of the arm 30 is preferably comprised of connecting webs 40 integral with the rim 31 and with a hub 41 at the central portion of the rear end 38.

The hub 41 is preferably provided with a plurality of bores 42, 43, for selective mounting on the arm axle 25 for adjustment to accord to different maximum lifting heights.

The lifter arm 30 contiguous to the front end 35 has an opening 44 for the reception of a support arm 45 which has a threaded end 46 for a star washer 47 and nut 48. The support arm 45 rests upon the housing 11 when the arm 30 is swung to its rearmost position.

The lifter arm 30 is retained on the arm axle 25 by a washer 50 and cotter pin 51, the cotter pin 51 engaging in an opening 52 in the arm axle 25.

In use, and with the lifter arm 30 forwardly disposed the mower 10 can be moved for grass cutting in the conventional manner and upon impelling the same under shrubbery and bushes the blunt point 35 will initially raise the lower branches which are on or close to the ground. Further successive engagement of these lower branches by the rim portions 36 and 37 permits rapid and uniform cutting of the grass without interference by the lower branches and without injury to the lower branches.

The pivotal mounting of the lifter arm 30 on the arm axle 25 permits accommodation of the forward end 35 of the arm 30 to irregularities of the lawn.

If and when desired the lifter arm 30 can be swung to its rear and out of use position about the pivot axis provided by the arm axle 25 with the support arm 45 engaged on the housing 11 to limit the rearward movement of the lifter arm 30.

I claim:

1. A shrubbery protector for mowers comprising
   a wheel supported mower housing with a mower blade carried therein for movement of the blade in a predetermined cutting path, and
   a shrubbery lifter arm for elevating shrubbery out of the cutting path of the mower blade to prevent the cutting thereof,
   said lifter arm having a boundary rim with a front end terminus and a portion extending therefrom for engagement with the ground and a diverging portion for shrubbery branch elevation,
   said lifter arm having a hub spaced interiorly of said rim, and
   a shaft extending through said hub for pivotal mounting of said arm,
   said shaft being carried by a wheel supporting shaft.
2. A shrubbery lifter as defined in claim 1 in which said ground engaging portion of said rim is round in transverse cross section.
3. A shrubbery lifter as defined in claim 1 in which said hub has a plurality of openings therethrough for selective height adjustment of said lifter arm.
4. A shrubbery lifter as defined in claim 1 in which a plurality of webs are provided extending inwardly from said rim and on which said hub is carried.
5. A shrubbery lifter as defined in claim 1 in which said lifter arm has a stop member carried thereon for limiting the rearward swinging of said lifter arm.
6. A shrubbery lifter as defined in claim 1 in which said hub is detachably mounted on said shaft.

* * * * *